Oct. 3, 1967    TETSUYA TAKENAKA    3,345,096

BUILDING COLUMN AND BEAM JOINT CONSTRUCTION

Filed Aug. 23, 1965

INVENTOR.
TETSUYA TAKENAKA
BY
ATTORNEY

United States Patent Office 3,345,096
Patented Oct. 3, 1967

3,345,096
BUILDING COLUMN AND BEAM
JOINT CONSTRUCTION
Tetsuya Takenaka, Osaka, Japan, assignor to Kubota
Tekko Kabushiki Kaisha, Osaka, Japan, a corporation
of Japan
Filed Aug. 23, 1965, Ser. No. 481,755
1 Claim. (Cl. 287—189.36)

ABSTRACT OF THE DISCLOSURE

A building column and beam joint construction which permits the effective and rapid welding of the column and beam at their intersections, and where the welded construction has a very high strength to support the other elements of the building.

---

This invention relates to a building column and beam joint construction, and particularly the construction of the connection between a column and one or more beams which extend therefrom.

An object of my invention is to provide a novel column construction which permits one or more beams to be welded thereto in such a manner that the connection or joint will have a very substantial strength to withstand required stresses on the building.

Another object of my invention is to provide a novel beam and column connection in which the column may be either tube shaped or may have some other suitable structural shape, depending upon the strength requirements on the column.

Another object of my invention is to provide a novel column and beam connection which can be formed at a factory, and subsequently taken to the place of use and then assembled, so that the spacing between adjacent beams or the like will be correct and properly positioned.

Still another object of my invention is to provide a column and beam connection in which these parts are welded together at the connection, and where the welded joint will be very strong and will withstand required as well as unusual stresses thereon.

Still another object of my invention is to provide a novel building column and beam joint which is particularly adaptable to a tubular shape of the column, and where the connection between the tubular column and a structural beam is accomplished by a welded joint which provides the required strength both in tension and in shear.

Other objects, advantages and features of invention may appear from the accompanying drawing, the subjoined detailed description and the appended claim.

Figure 1:
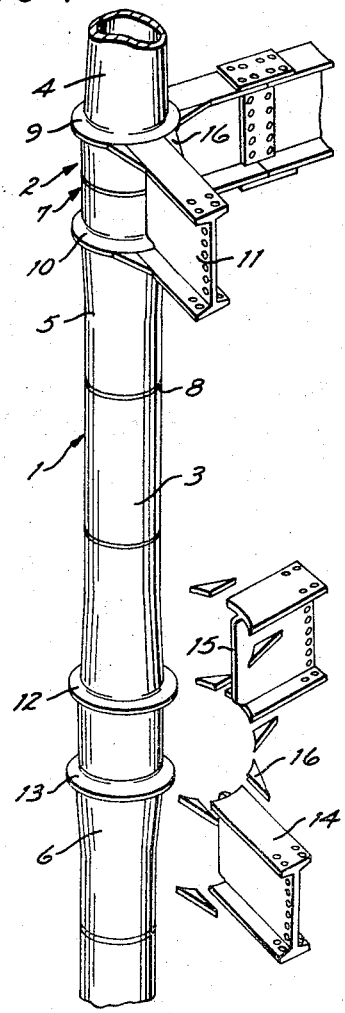
FIGURE 1 is a perspective view of a column and beam connection with one part of the figure being exploded to show the various components.
Figure 2:
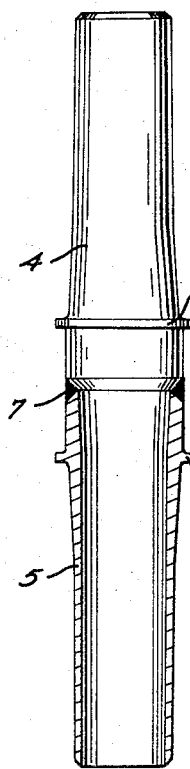
FIGURE 2 is a side elevation of one type of tubular column construction.
Figure 3:
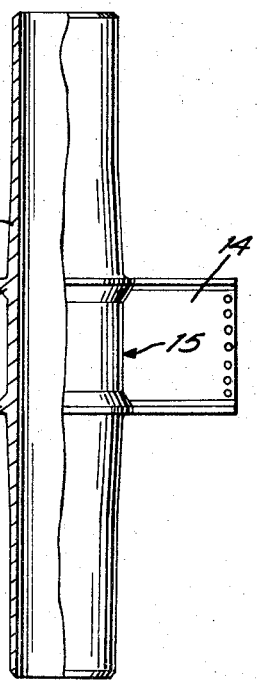
FIGURE 3 is a side elevation partly in section of a column and beam connection.

While I will first described a tubular column and the construction of the connection between such a column and a beam, it will be understood that the column may be either tubular or various other configurations, depending upon the strength requirements of the column. The column 1 is formed with a joint section 2 and intermediate tubular sections 3 which space adjacent joint sections 2 to provide proper spacing between adjacent beams. The joint section 2 consists of two complementary sections 4–5, or a single continuous section 6 as shown in FIGURE 3. If the joint consists of two complementary sections such as 4 and 5, then these two sections are welded together by means of a continuous weld 7. The upper and lower sections 4–5 are each welded to a spacer 3 by means of a continuous weld 8, thus forming the entire column. The section 4 is formed with an integral flange 9 adjacent the lower end thereof. The complementary section 5 is also formed with an integral flange 10, and these flanges 9–10 are properly spaced to receive a beam 11 therebetween, as will be more specifically described. It will be evident that the sections 4–5 or 6 can be cast at a foundry, or may be rolled, and are then transported to the building site for subsequent assembly by welding the parts together in the manner previously described.

In event that the welded joint 7 is not desirable, then a column section such as the section 6 may be utilized, which is provided with spaced flanges 12–13 as shown in FIGURE 3. The flanges 9–10, 12 and 13 are each shaped to receive the shaped ends of the beams 11 or 14. If the beams 11, 14 are shaped as an I-beam, then the web is shaped to fit accurately between the flanges 9–10 or 12–13, and a portion of the web will bear against the tubular portion of the column 1 so that a continuous weld can be formed to attach the beam to the column. This shaped portion of the web of a beam is indicated at 15. The upper and lower flanges of the I-beam may be curved or otherwise shaped to butt against the outer periphery of the flanges. Again this permits a continuous welded joint to be formed. For further strength and rigidity I may provide fillet sections 16 which fit between the periphery of the flanges and the adjacent edges of the attached beam. These fillets are also welded to both the beam and the flange on the column to provide an additional strengthening structure.

Figure 4:
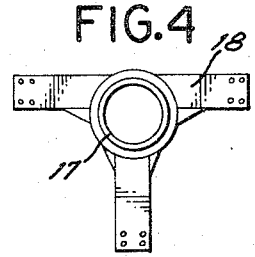
FIGURE 4 is a top plan view of an intermediate column and beam connection.

By shaping the attached beam, it is possible to extend that beam at different angles to a vertical column, such as 1. In other words, the beam need not be at right-angles to the column, but can be at some other angle either greater or less than a right-angle. Also the circular flanges 9–10, 12–13 permit the beams to be positioned at various circular angles around a column 17, as shown in FIGURE 4. In this instance the beams 18 are positioned at a point between the corners of a structure, and are termed intermediate column and beam connections.

Figure 5:
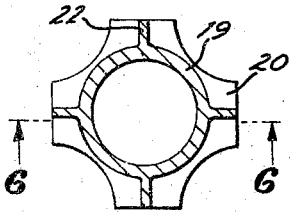
FIGURE 5 is a horizontal sectional view of one type of tubular column.
Figure 6:
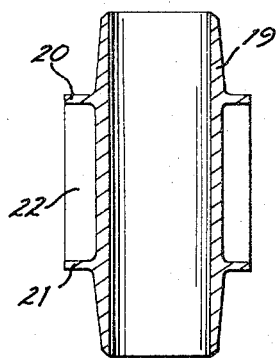
FIGURE 6 is a sectional view taken on line 6—6 of FIGURE 5.

In FIGURES 5, 6, 7 and 8 I have illustrated other shapes for a column structure. In FIGURES 5 and 6 the column 19 is formed with spaced flanges 20–21, and these flanges are not circular in shape but are scalloped for the purpose of reducing the weight of the column. Also the flanges 20–21 may be strengthened by means of the webs 22.

Figure 8:
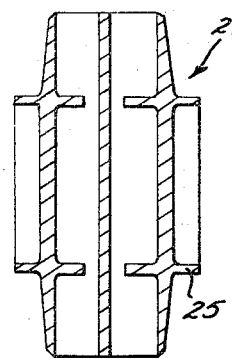
FIGURE 8 is a sectional view taken on line 8—8 of FIGURE 7.
Figure 7:
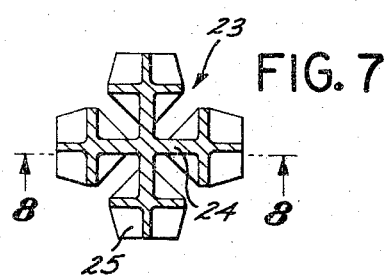
FIGURE 7 is a horizontal sectional view of still another possible shape of a column embodying my invention.

In FIGURES 7 and 8 the column section 23 may consist of a plurality of outwardly extending arms 24, each of which is formed with a flange 25 to which a beam may be attached in the manner previously described.

Having described my invention, I claim:

A structural column and beam assembly comprising a tubular column formed of metal, said column including a pair of spaced rings annular in form, and said rings projecting at right-angles to the axis of the column, a beam associated with the column and fitting between the rings, the end of said beam being shaped to fit the column and rings, said beam including flanges thereon, and a web connecting said flanges, said beam being welded to the column and the rings at one end of the beam, the shaped end of the beam including flange ends having a concave shape complementary to the external surface of the rings, and a web portion extending between the rings and engaging the rings and the column.

References Cited

UNITED STATES PATENTS

| 485,870 | 11/1892 | Larimer | 287—189.36 |
| 2,019,684 | 11/1935 | Leake | 287—189.36 |

EDWARD C. ALLEN, *Primary Examiner.*